(12) United States Patent
Thorsbakken

(10) Patent No.: US 8,083,483 B1
(45) Date of Patent: Dec. 27, 2011

(54) WATER WHEEL BARRAGE ENERGY CONVERTER

(76) Inventor: Arden L Thorsbakken, Eau Claire, WI (US)

( * ) Notice: Subject to any disclaimer, the term of this patent is extended or adjusted under 35 U.S.C. 154(b) by 442 days.

(21) Appl. No.: 12/386,387

(22) Filed: Apr. 18, 2009

Related U.S. Application Data

(60) Provisional application No. 61/125,729, filed on Apr. 26, 2008.

(51) Int. Cl.
*F03B 11/00* (2006.01)
(52) U.S. Cl. ............................................. 416/78; 415/1
(58) Field of Classification Search .................. 416/78, 416/87–89, 101, 117, 119, 246, 247 R, 247 A; 415/1, 905, 906, 3.1, 4.1
See application file for complete search history.

(56) References Cited

U.S. PATENT DOCUMENTS

| | | | |
|---|---|---|---|
| 4,519 A | 5/1846 | Hand | |
| 4,843 A | 11/1846 | Rowand | |
| 98,891 A | 1/1870 | Sory | |
| 113,284 A | 4/1871 | Folsom | |
| 203,382 A | 5/1878 | Smith | |
| 226,357 A | 4/1880 | Saccone | |
| 244,221 A | 7/1881 | Fountain et al. | |
| 302,769 A | 7/1884 | Pallausch | |
| 600,173 A | 3/1898 | Robarts | |
| 692,714 A | 2/1902 | Sala et al. | |
| 924,684 A | 6/1909 | Martin | |
| 998,446 A | 7/1911 | Amy | |
| 1,757,761 A | 5/1930 | Wendt | |
| 2,041,103 A | 5/1936 | Zegers | |
| 3,156,278 A | 11/1964 | Otto | |
| 3,692,427 A | 9/1972 | Risse | |
| 4,211,076 A | 7/1980 | Grande | |
| 4,270,056 A | 5/1981 | Wright | |
| 4,365,929 A * | 12/1982 | Retz | 415/53.1 |
| 4,383,797 A | 5/1983 | Lee | |
| 4,514,644 A | 4/1985 | Westling | |
| 4,598,210 A | 7/1986 | Biscomb | |
| 4,618,312 A | 10/1986 | Williams | |
| 4,717,831 A | 1/1988 | Kikuchi | |
| 4,776,762 A | 10/1988 | Blowers, Sr. | |
| 4,931,662 A | 6/1990 | Burton | |
| 5,098,264 A | 3/1992 | Lew | |
| 5,430,332 A | 7/1995 | Dunn, Jr. | |
| 5,708,305 A | 1/1998 | Wolfe | |
| 5,789,826 A | 8/1998 | Kumbatovic | |
| 6,065,935 A | 5/2000 | Perfahl | |
| 6,091,161 A | 7/2000 | Dehlsen et al. | |
| 6,365,984 B1 | 4/2002 | Shu | |
| 6,499,939 B2 | 12/2002 | Downing | |
| 6,551,053 B1 | 4/2003 | Schuetz | |

(Continued)

*Primary Examiner* — Gary F. Paumen
(74) *Attorney, Agent, or Firm* — Skinner and Associates

(57) ABSTRACT

A wheel-type of moving water energy conversion device consists of a limited number of paddles or blades attached to struts, which are secured to a central axis or geared drive shaft. The paddles or blades are hinged to the struts in a unique underneath forward position, allowing the paddle or blade to enter water in an energy conversion, flat plane and exit from water in vertical non-water lifting position. The utilization of extension arms securing paddles, the limitation of engineered positioning of paddles and the design of free paddle exit from water, provide a uniquely efficient energy conversion device for use in moving waters, such as rivers, streams, tidal flows or lake and ocean waves and currents. The device may be engineered as a low profile, rotary barrage type, with paddles or blades positioned on struts with or without telescopic arms.

23 Claims, 9 Drawing Sheets

U.S. PATENT DOCUMENTS

| | | |
|---|---|---|
| 6,616,403 B1 | 9/2003 | Smith et al. |
| 6,856,036 B2 | 2/2005 | Belinsky |
| 7,093,017 B1 | 8/2006 | Olgaard et al. |
| 7,094,017 B2 | 8/2006 | Kurita |
| 7,105,942 B2 | 9/2006 | Henriksen |
| 7,213,398 B2 | 5/2007 | Takeuchi |
| 7,329,099 B2 * | 2/2008 | Hartman .................. 416/132 B |
| 2008/0008588 A1 * | 1/2008 | Hartman .................. 416/132 B |
| 2008/0211232 A1 | 9/2008 | Helfrich |
| 2008/0258465 A1 | 10/2008 | Johnston |
| 2009/0015014 A1 | 1/2009 | Devaney |
| 2010/0119362 A1 * | 5/2010 | Becker et al. ................. 415/191 |
| 2011/0115228 A1 * | 5/2011 | Stothers et al. ................. 290/52 |

* cited by examiner

WATER WHEEL BARRAGE ENERGY CONVERTER

CROSS-REFERENCE TO RELATED APPLICATIONS, IF ANY

This application claims the benefit under 35 U.S.C. §119(e) of provisional application Ser. No. 61/125,729, filed Apr. 26, 2008. Application Ser. No. 61/125,729 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to the fields of hydro power energy conversion from moving waters, including various wave energy converters, hydro turbines situated in rivers, lakes and tidal flows. In particular, the invention relates to water wheel types of devices.

2. Background Information

A vast source of potential energy is not presently being captured from the thousands of flowing streams, tidal currents, tidal streams and ocean and lake waves. In antiquity, water wheels were devised and used as grist mills and as water pumping machines. Yet today, water wheels are utilized in many countries in addition to hydro turbines. Historically, it has been difficult to obtain useable energy from slow-moving waters, with water falls and constructed dams being the source of hydro energy through capture of the potential energy of the water head. In this instance, the use of hydro turbines is employed. Hydro turbines are somewhat efficient, but they have the disadvantage of being expensive and require considerable maintenance for continued use. In addition, hydro turbines can be destructive of fish and aquatic life, as well as sensitive to floating debris. Such turbines also are limited in degree of energy conversion by their fluid entrance chamber.

Many suggestions as to various methods of capture of energy from flowing waters have been made through the years, including complicated, complex networks of coffer dams, concentrating valves, storage basins and underwater hydro planes, with reversible blades. In the majority of these propositions, the cost factor is limiting, and the effect of storms and floods reduces the practicality of their application. In addition to these, a system of utilization of Pelton wheels has been patented, which define buckets attached to a rotating wheel. The buckets have flowing waters confined in such manner that they form a water jet impinging upon or into the buckets.

The historic method of capture and conversion of flowing, cascading and waterfall water energy conversion is the employment of water wheels, of which there are four major types or styles. The most historical and familiar to us is the under shot water wheel, which is a vertical structure secured on a central axis with attached paddles or scoops. In like manner is the overshot water wheel that is caused to rotate via the flow of waters from an elevation, such as water falls, flumes or pipes conveying water from a distance, and which water is at a higher elevation. This same device can be utilized as a cross flow water wheel.

In all of the water wheel systems proposed to date, water flow is captured via paddles or blades that are attached to a wheel of considerable height for efficiency, with the paddles or blades positioned in close proximity to each other. Kinetic energy is wasted when one blade is located immediately or in close proximity behind another, since little or no water flow reaches the rearward blade and power is lost in dragging the rearward blade through and up and out of the water, which arrangement causes "slushing" of the waters against the axel or support shaft and its attached following blade. The waters from the forward flow blade impede the efficiency of the following blade and those that follow as they traverse in the same path way.

The for-runner of a great number of under shot water wheels is illustrated in U.S. Pat. No. 4,517 by C. Hand, issued May 16, 1846. In this patent, an attempt is made to have flow engaged paddles active on the up flow side of the waters and then to flow into the housing on the down side of the device, with the intent of allowing a free exit of fluid from the blades for efficiency. The difficulty of this system is two fold. First, if the wheel is rotating at fewer revolutions per minute than the flow of waters, the blades will not fold in toward the housing because of water pressure holding them outward. The only remedy of this difficulty is to include springs of some sort that would cause the blades to fold in at a selected segment of the rotation, in which case efficiency would be lost. Second, the blades will not enter the upstream waters until the waters have reached near the outward or tip end of the blades due to inward pressure.

Following the issuance of the above patent, a great number of individuals have patented devices that are intended to circumvent the above objections, all of which require complicated moving parts and expensive manufacture, without proven effectiveness.

Among these patents are: U.S. Pat. No. 7,094,017 B2, Aug. 22, 2006; U.S. Pat. No. 6,616,403 B1, Sep. 9, 2003; U.S. Pat. No. 6,499,939 B2, Dec. 31, 2002; U.S. Pat. No. 6,065,935, May 23, 2000; U.S. Pat. No. 5,098,264, Mar. 24, 1992; U.S. Pat. No. 4,776,762, Oct. 11, 1988; U.S. Pat. No. 4,618,312, Oct. 21, 1986; U.S. Pat. No. 4,383,797, May 17, 1983; U.S. Pat. No. 3,692,427, Sep. 19, 1972; U.S. Pat. No. 3,156,278, Nov. 10, 1964; U.S. Pat. No. 1,757,761, May 6, 1930; U.S. Pat. No. 692,714, Feb. 4, 1902; U.S. Pat. No. 226,357, Apr. 6, 1880; U.S. Pat. No. 203,382, May 7, 1878.

U.S. Pat. No. 98,891, Jan. 18, 1870, Current Water Wheel, by A. M. Sory discloses a central drive shaft with blades secured on struts. The device, however, has congestion of blades limiting efficiency as noted above, and there is no provision for the blades to not resist out positioning on the out-of-water arch, and thus, they have limited efficiency.

U.S. Patent Application 20080211232, Sep. 4, 2008, describes a water wheel consisting of foldable vanes designed with hydro foil features included, while diverting water to the vanes for greater power.

U.S. Pat. No. 4,270,056, May 26, 1981, discloses a device with two sets of three bladed assemblies affixed to a drive shaft, and these assemblies are secured on struts extending outward from the drive shaft and are so arranged that each blade does not impede the preceding blade in effective energy transfer. The system requires the positioning of each of the three blade units adjacent to each other, such that one blade of a unit is constantly in an energy transfer stance, while the blade on the other unit is out of the water. There is no provision for blades to effortlessly exit the waters and thus, efficiency is lost in this arrangement. There is a loss of power with the blades adjacent to each other as the waters at the working blade positions are forced to move sideways toward the other blade or outward away from the blades. In the first case, resistance is encountered, while in the second, loss of effective flow is produced.

Applicant has devised an energy efficient system for obtaining power from flowing water that is an improvement over the existing technology.

SUMMARY OF THE INVENTION

The invention is directed to a moving water energy conversion device, adapted for secure positioning in or on flowing waters. The energy conversion device includes a supported drive shaft member with an odd number of at least three radial extension strut assemblies. Each strut assembly is secured at a proximal end to the drive shaft member. The radial strut assemblies are positioned equidistance apart on the drive shaft member, with each strut assembly having at least two strut members. Each strut member is attached at a distal end, through a hinge member, to a radially oriented, planar, paddle blade member separated from the drive shaft member. Each planar, paddle blade member is rotatable against the radial strut assembly in an active energy conversion segment of a rotary cycle. Each planar, paddle blade member, by fluid pressure of moving water, reverts to a vertical stance as the planar, paddle blade member is elevated out of moving water by the individual radial extension strut assembly attached thereto.

In a further embodiment of the invention, the radial strut members include at least first and second telescoping sections constructed for telescopic extension and return of the strut members. In addition, the planar, hinged paddle blade members each include opposed, non-planar end sections, thereby confining moving water contacting the planar, paddle blade member there between in the active energy conversion segment of the rotary cycle.

In another embodiment of the invention, the planar, hinged paddle blade members each include a plurality of overlapping horizontal blade segments, with each segment attached at a first edge through a hinge member to each associated strut member. A second opposed edge of each blade segment overlaps the first edge of an adjacent blade segment in the active energy conversion segment of the rotary cycle. Each blade segment reverts to a vertical stance as the blade segment is elevated out of the moving water by the individual radial extension strut assembly attached thereto.

A plurality of moving water energy conversion devices of the present invention may be arranged in an array, such that the width of the array provides a formidable bank of such devices. The array or bank of devices may be positioned partially or completely across a flow stream, including tidal channels, thereby producing both energy conversion and an anti-erosion function.

DESCRIPTION OF THE EMBODIMENTS

Nomenclature

Figure 1:
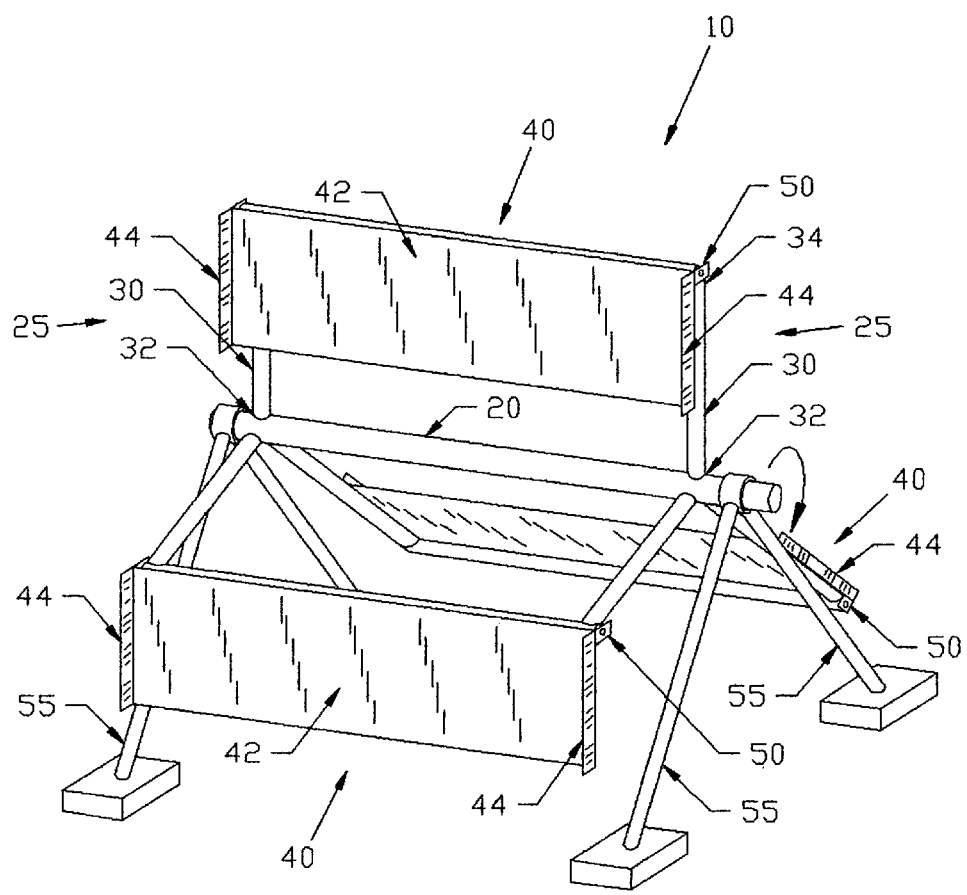
FIG. 1 is a perspective view of one embodiment of the moving water energy conversion device of the present invention.

| | |
|---|---|
| 10 | Moving Water Energy Conversion Device |
| 20 | Drive Shaft Member |
| 25 | Radial Extension Strut Assembly |
| 30 | Extension Strut Member |
| 32 | Proximal End of Strut Member |
| 34 | Distal End of Strut Member |
| 36 | First Section of Telescoping Strut Member |
| 38 | Second Section of Telescoping Strut Member |
| 40 | Planar Paddle Blade Member |
| 42 | Planar Section of Blade Member |
| 44 | Opposed End Sections of Blade Member |
| 46 | Horizontal Blade Segment |
| 48 | First Edge of Blade Segment |
| 49 | Second Edge of Blade Segment |
| 50 | Hinge Member |
| 55 | Legged Support Platform |
| 60 | Debris Screen Device |
| 70 | Mechanical Positioning Device |
| 72 | Telescoping Frame Member |
| 74 | Hydraulic Piston |
| 76 | Anchoring Support |
| 78 | Pivoting Base Plate of Frame Member |
| 80 | Vessel Support Platform |
| 82 | Ballast Tanks of Vessel |
| 90 | Electrical Generator Unit |
| 92 | Electrolysis Unit |
| 94 | Reciprocal Fluid Pump Unit |
| 96 | Helical Screw Pump Unit |

Construction

The invention is a moving water energy conversion device adapted for secure positioning in or on flowing waters. The energy conversion device includes a supported drive shaft member with an odd number of at least three radial extension strut assemblies. Each strut assembly is secured at a proximal end to the drive shaft member. The radial strut assemblies are positioned equidistance apart on the drive shaft member, with each strut assembly having at least two strut members. Each strut member is attached at a distal end, through a hinge member, to a radially oriented, planar, paddle blade member separated from the drive shaft member. Each planar, paddle blade member is rotatable against the radial strut assembly in an active energy conversion segment of a rotary cycle. Each planar, paddle blade member, by fluid pressure of moving water, reverts to a vertical stance as the planar, paddle blade member is elevated out of moving water by the individual radial extension strut assembly attached thereto.

In a further embodiment of the invention, the radial strut members include at least first and second telescoping sections constructed for telescopic extension and return of the strut members. In addition, the planar, hinged paddle blade members each include opposed, non-planar end sections, thereby confining moving water contacting the planar, paddle blade member there between in the active energy conversion segment of the rotary cycle.

In another embodiment of the invention, the planar, hinged paddle blade members each include a plurality of overlapping horizontal blade segments, with each segment attached at a first edge through a hinge member to each associated strut member. A second opposed edge of each blade segment overlaps the first edge of an adjacent blade segment in the active energy conversion segment of the rotary cycle. Each blade segment reverts to a vertical stance as the blade segment is elevated out of the moving water by the individual radial extension strut assembly attached thereto. The configuration of the present invention provides for energy conversion by the device in contra flowing waters, such as tidal flows and in estuaries, without physical adjustment of the energy conversion device.

Referring now to FIG. 1, a first embodiment of the moving water energy conversion device 10, adapted for positioning on a secure platform, is shown. The energy conversion device 10 includes a supported drive shaft member 20 with an odd number of at least three radial extension strut assemblies 25. Each strut assembly 25 is secured at a proximal end 32 to the drive shaft member 20. Preferably, the odd number of radial extension strut assemblies 25, each secured at a proximal end 32 to the supported drive shaft member 20, is selected from the group consisting of three, five, seven and nine strut assemblies 25. The radial strut assemblies 25 are positioned equidistance apart around the drive shaft member 20, with each strut assembly 25 having at least two strut members 30. Each strut member 30 is attached at a distal end 34, through a hinge member 50, to a radially oriented, planar, paddle blade member 40 separated from the drive shaft member 20. In the embodiment shown in FIG. 1, the drive shaft member 20 is supported at each end by legged support platforms 55. End views of the preferred embodiments of the drive shaft 20, strut assemblies 25 and hinged, paddle blade members 40, without the legged support platform 55, are shown in FIGS. 4a-4d.

Figure 2:
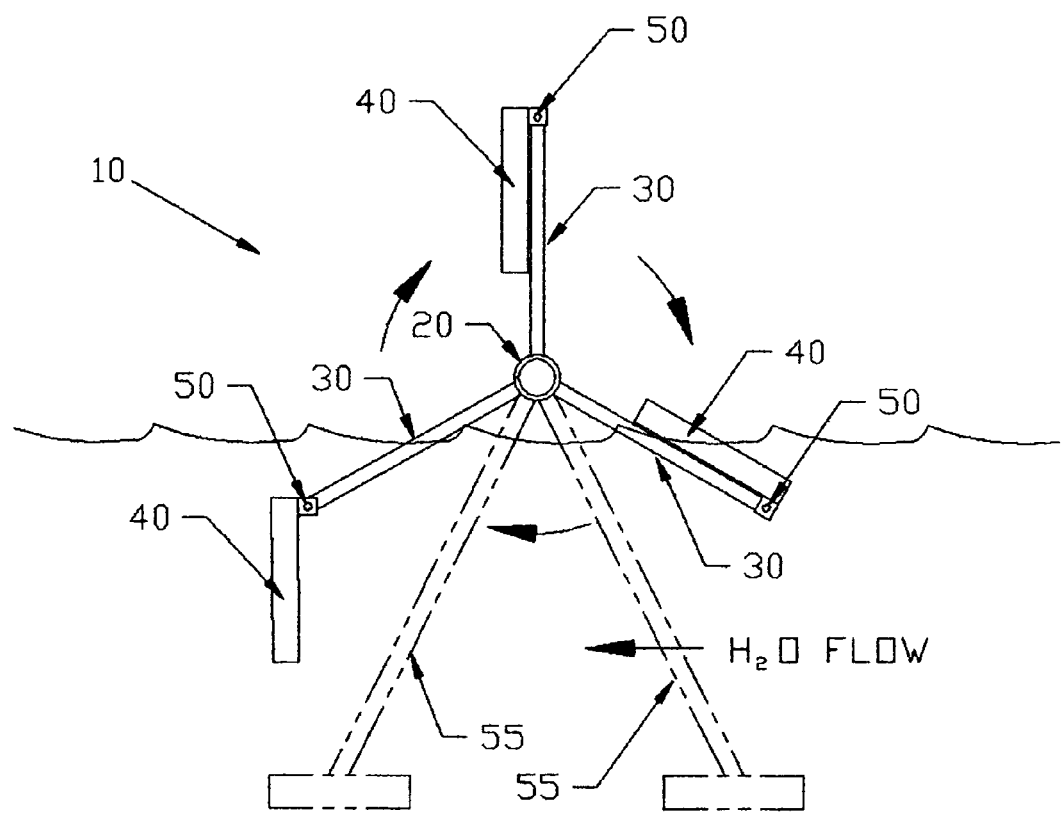
FIG. 2 is an end view of the embodiment of the moving water energy conversion device of FIG. 1 of the present invention with the support legs shown in phantom.

FIG. 2 provides an end view of the energy conversion device 10 positioned in flowing water. The legged support platform 55 is shown in phantom for clarity. As the water flow contacts the conversion device 10, each planar, paddle blade member 40 is rotatable against the radial strut assembly 25 in the active energy conversion segment of a rotary cycle, where the paddle blade member 40 is partly or completely immersed in the water. Each planar, paddle blade member 40, by fluid pressure of the moving water, reverts to a vertical stance as the planar, paddle blade member 40 is elevated out of the moving water by the individual radial extension strut assembly 25 attached thereto. Thus, the paddle blade member 40 enters the water in an energy conversion flat plane and exits the water in a vertical stance with little water weight resistance, thus providing a device with superior efficiency.

Figure 3:
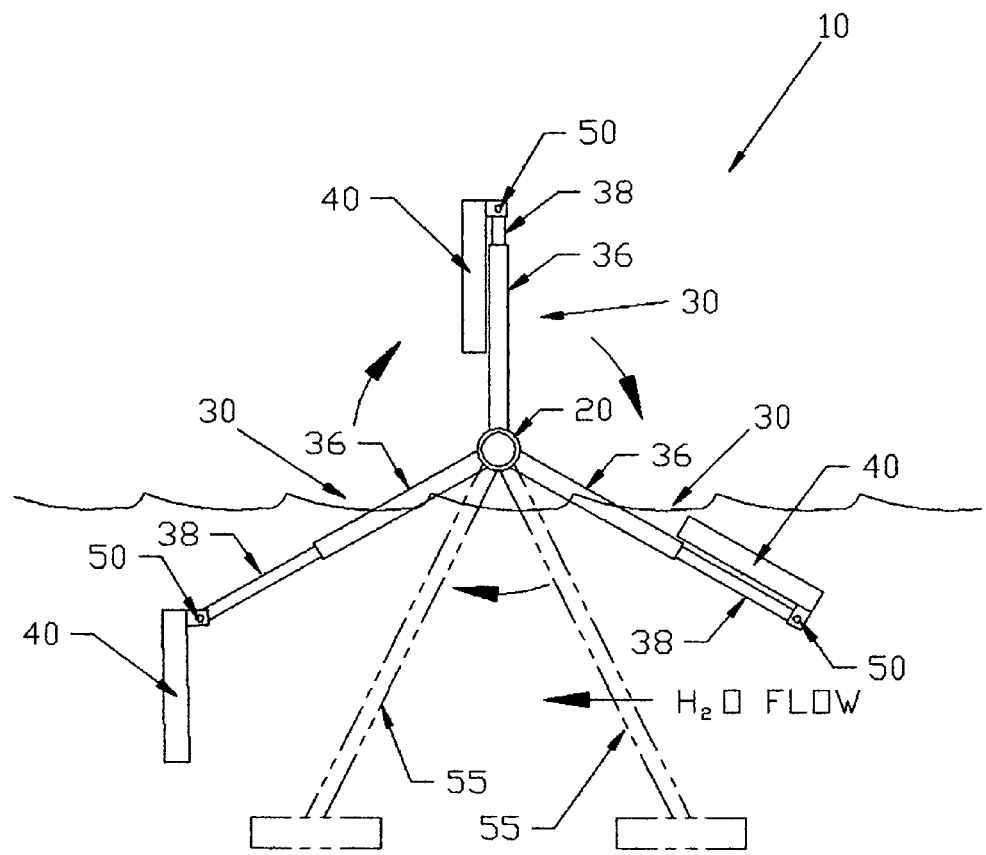
FIG. 3 is an end view of a further embodiment of the moving water energy conversion device of FIG. 1 of the present invention with the support legs shown in phantom.
Figure 4A:
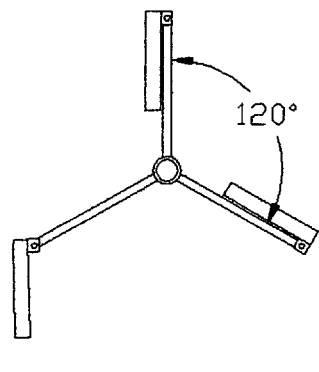
FIG. 4a is an end view of one embodiment of the moving water energy conversion device of the present invention.
Figure 4B:
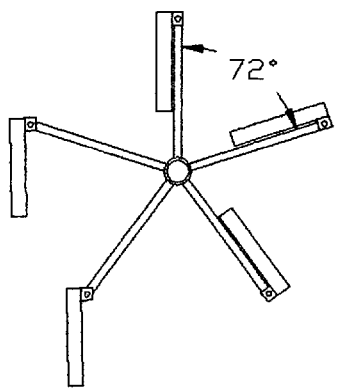
FIG. 4b is an end view of another embodiment of the moving water energy conversion device of the present invention.
Figure 4C:
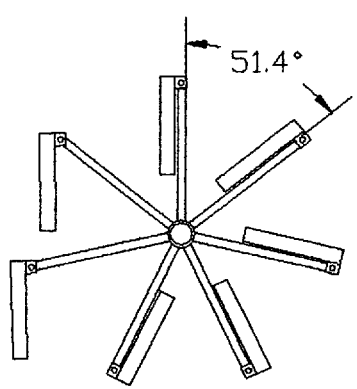
FIG. 4c is an end view of yet another embodiment of the moving water energy conversion device of the present invention.
Figure 4D:
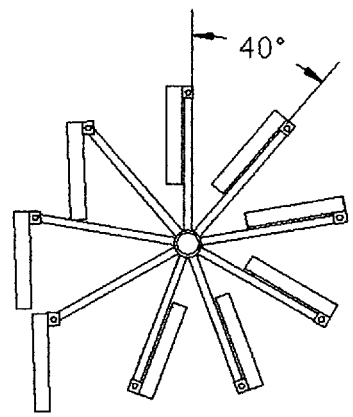
FIG. 4d is an end view of yet another embodiment of the moving water energy conversion device of the present invention.

Referring now to FIG. 3, a further embodiment of the moving water energy conversion device 10 is shown in a side view. Again, the legged support platform 55 is shown in phantom for clarity. In this embodiment, the radial extension strut members 30 of the strut assemblies 25 are constructed for telescopic extension and return. The strut members 30 include a first telescoping section 36, secured to the drive shaft member 20, and second telescoping section 38 attached to the first section 36. Each second telescoping section 38 is attached to a hinge member 50 secured to the planar, paddle blade member 40. Thus, as the blade member 40 enters the flowing water, the telescoping strut members 30 attached thereto, extend away from the drive shaft member 20 and provide greater power as the blade member 40 sweeps through a larger arc. As described above, each planar, paddle blade member 40 reverts to a vertical stance as the planar, paddle blade member 40 is elevated out of moving water by the individual radial extension strut assembly 25 attached thereto. Additionally, as the strut assembly 25 and attached paddle blade member 40 approaches vertical, the telescoping strut members 30 contract to lower wind resistance that may be caused by the paddle blade member 40 while in the air. Additionally, the paddle blade members 40 can be adjusted according to wind velocity and direction for maximum energy transfer efficiency.

Of importance, for esthetic reasons, is the low profile of the energy conversion device 10, especially when positioned offshore near populated areas or on rivers and streams, as well as near shores or banks populated by villages and cities. A preferred location for energy conversion by the energy conversion device 10 is the outflow channel of hydro electric dams or the spillway platform thereof, or the outflow channel of non-hydroelectric water retention dams and barrages.

The paddle blade member 40 of the energy conversion device 10 may be of a varied length and width, depending upon the area of positioning of the device 10. An example is a three bladed device 10, with strut assemblies 25 of moderate length, securing paddle blade members 40 of twenty feet in length by four feet in depth. The device 10 is positioned in a gulf stream or tidal flow, singly, or combined with other such units in an array to effectively compose a barrage with regulated rotation of the devices 10 producing a great amount of useable energy. Such a barrage or rotating dam can, in addition, be considered as a shore line protective instrument. This same rotating water wheel barrage can be effective in both ebb and tide flow of tidal waters.

Figure 5:
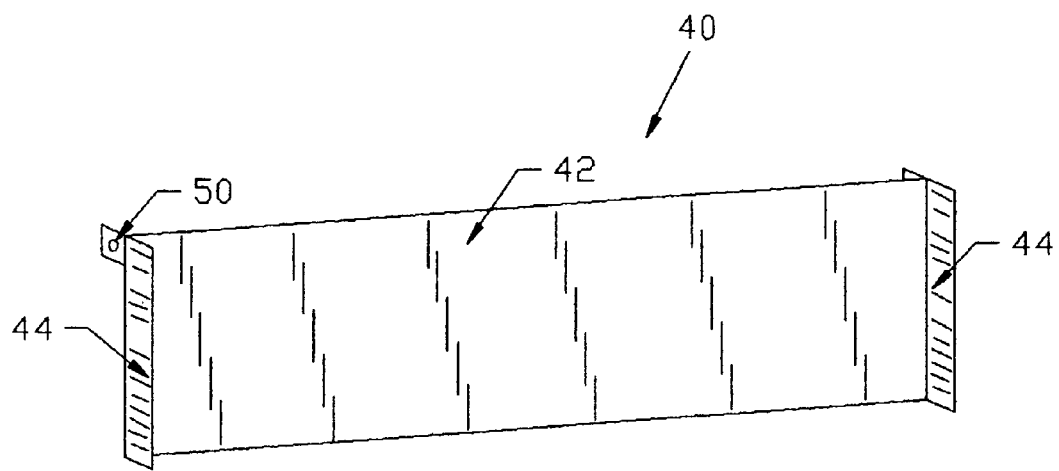
FIG. 5 is a perspective view of one embodiment of the planar paddle blade member the moving water energy conversion device of the present invention.

Referring now to FIG. 5, a preferred embodiment of the planar, paddle blade member 40 is illustrated. Although the planar, paddle blade member 40 may be a sheet-like structure, it is preferred that the blade member 40 be modified for increased efficiency. In the preferred embodiment, the planar, hinged paddle blade members 40 each includes opposed, non-planar end sections 44, thereby confining moving water contacting the planar, paddle blade member 40 there between in the active energy conversion segment of the rotary cycle. The opposed end sections 44 limit passage of flowing water around the ends of the blade member 40.

Figure 6:
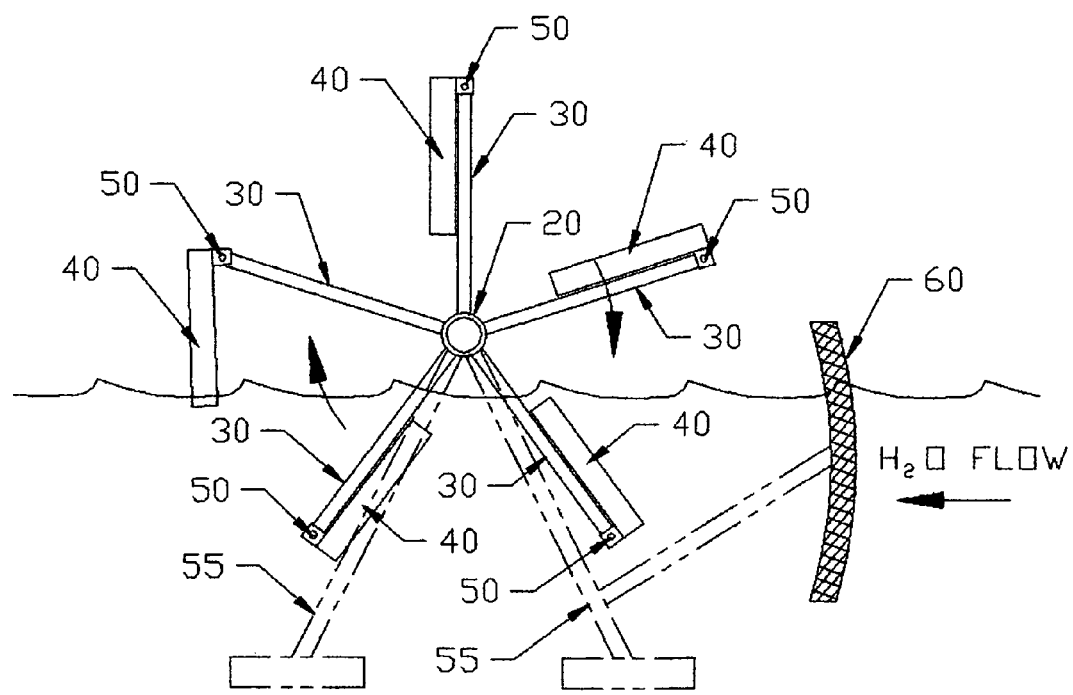
FIG. 6 is an end view of yet another embodiment of the moving water energy conversion device of the present invention fitted with a debris screen device.

As illustrated in FIG. 6, the energy conversion device 10 includes an adjustable, fluid flow facing, debris screen device 60 for protecting the water contacting portions of the energy conversion device 10 from floating debris carried by the moving water.

Figure 7A:
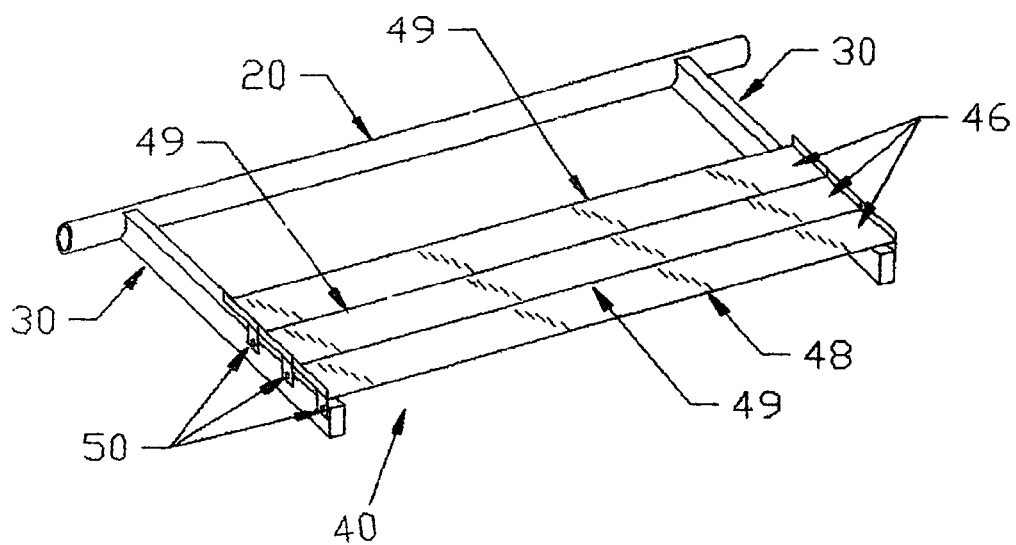
FIG. 7a is a perspective view of an alternative embodiment of the paddle blade member of the moving water energy conversion device of the present invention.
Figure 7B:
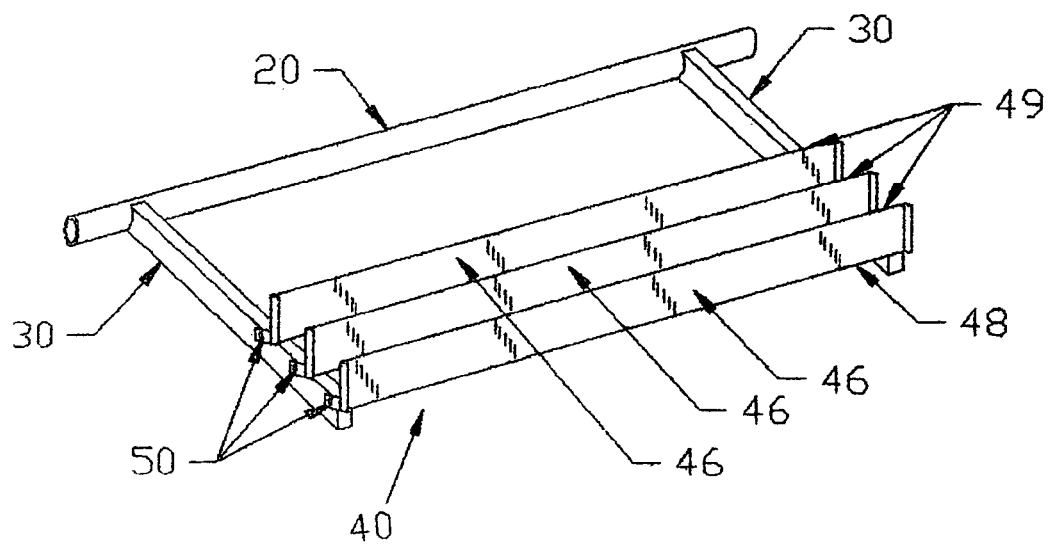
FIG. 7b is another perspective view of an alternative embodiment of the paddle blade member of the moving water energy conversion device of the present invention.

An alternative embodiment of the planar, hinged paddle blade members 40 is illustrated in FIGS. 7a and 7b. In this embodiment, the planar, hinged paddle blade members 40 each include a plurality of overlapping horizontal blade segments 46. Each blade segment 46 is attached at a first edge 48 through a hinge member 50 to each associated strut member 30, with a second opposed edge 49 of each blade segment 46 overlapping the first edge 48 of an adjacent blade segment 46 in the active energy conversion portion of the rotary cycle. Thus, as the paddle blade member 40 enters the flowing water, the blade segments 46 collapse against the strut members 30 in an overlapping configuration. This configuration provides a continuous surface for the paddle blade member 40 to retain the flowing water. As the paddle blade member 40 approaches exit from the surface of the water, each blade segment 46 pivots on the attached hinges 50 to essentially a vertical orientation, exiting the water with minimal energy loss. As the paddle blade member 40 approaches vertical in the air, the blade segments 46 pivot against the strut members 30 to form a continuous surface for the active energy conversion portion of the rotary cycle.

In another example application, the device 10 is positioned on barges or suspended from a ship or shore with a support structure that includes a mechanical positioning device 70 with gearing or hydraulics capable of elevating the device 10 completely out of water, i.e., a tilt up system, for repositioning and for safety in case of storms or unusual waves. The device 10 may have integral flotation appendages, which can be mechanically or electronically adjusted as to specific flotation requirements. These same flotation devices may be computer coordinated, such that they are sensitive to waves, currents and differing atmospheric pressures. The device 10 can be geared for helical power delivery to electrical generators, rotary pumps, reciprocal pumps, or spiral elevators for deposition of water into the shore or to a ship-based elevated container. The resulting volume pressure may be utilized for distance irrigation or, with pressure of at least 900 lbs. per sq./in., for reverse osmosis of salt or brackish waters.

Figure 8:
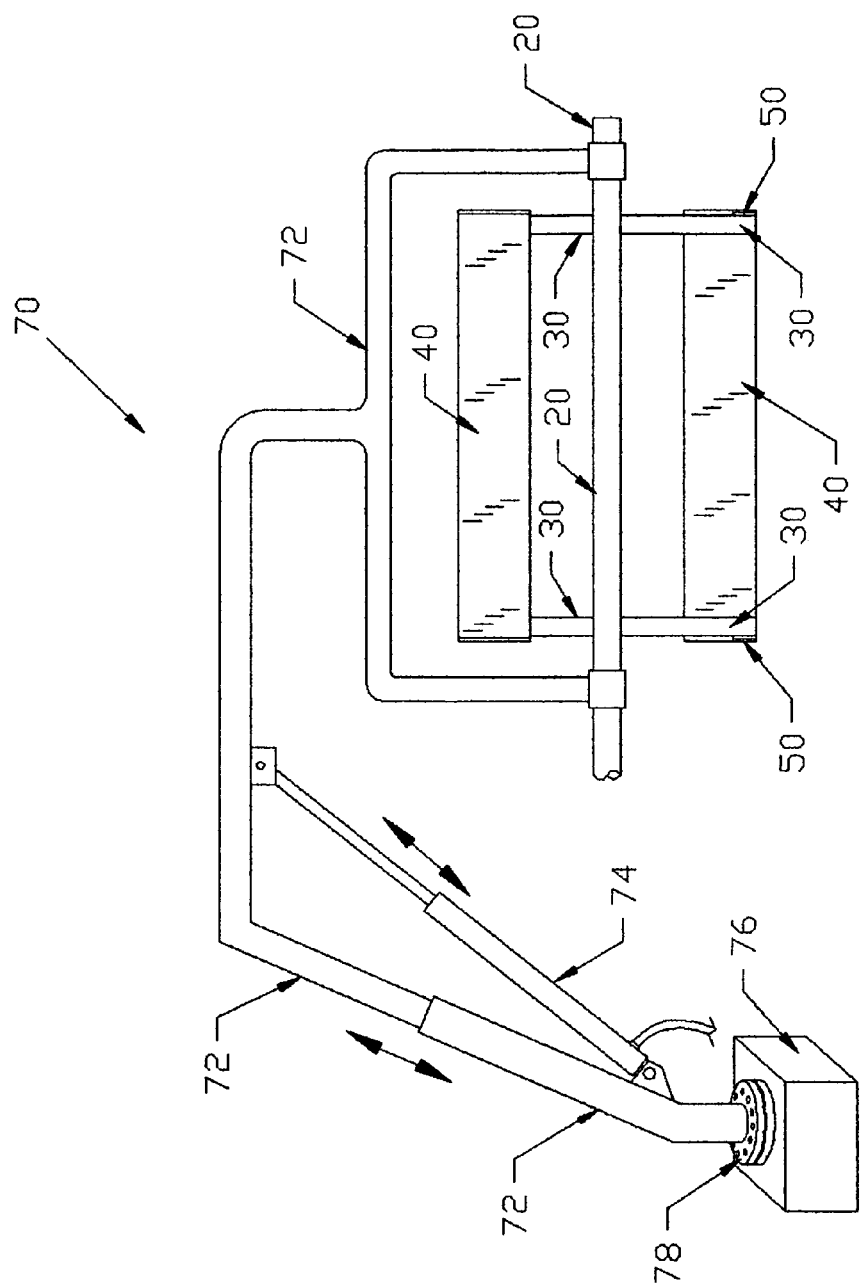
FIG. 8 is a side view of the moving water energy conversion device of the present invention used in conjunction with a mechanical positioning device.

As illustrated in FIG. 8, the drive shaft member 20 is supported by the mechanical positioning device 70 including, for example, a telescoping frame member 72 secured to an anchoring support 76. The telescoping frame member 72 includes a hydraulic piston 74 for elevating or lowering the moving water energy conversion device 10 via telescoping of the frame member 72. Similarly, the device 10 can be pivoted horizontally by rotation of the pivoting base plate 78 connecting the frame member 72 to the anchoring support 76.

Figure 9:
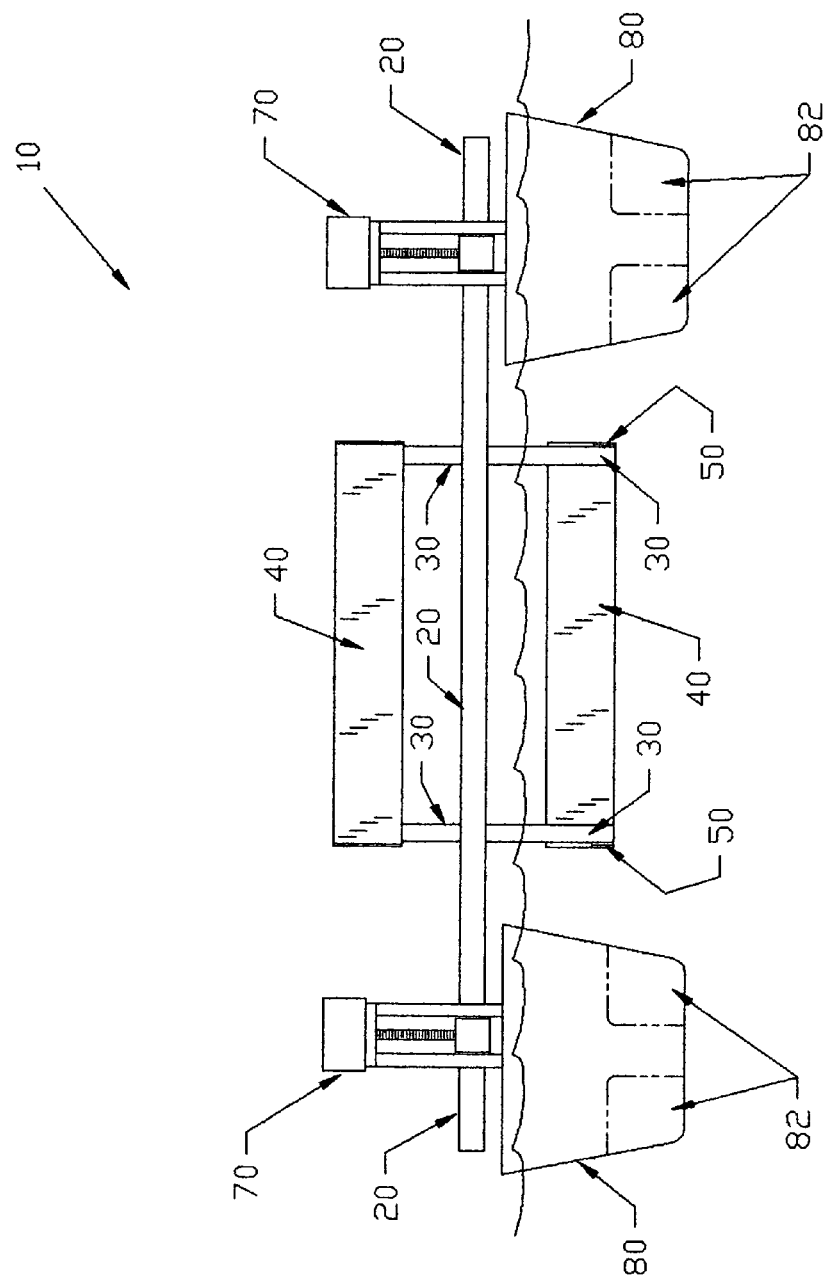
FIG. 9 is a sea level view of the moving water energy conversion device of the present invention used in conjunction with a pair of vessels.

FIG. 9 provides a sea level view of the moving water energy conversion device 10 of the present invention used in conjunction with a pair of vessels 80 that constitute a secure platform. In this embodiment, the drive shaft member 20 is rotatably mounted between two vessels 80, each fitted with a mechanical positioning device 70 for selective vertical and/or horizontal movement of the energy conversion device 10. The mechanical position device 70 can be employed to remove the energy conversion device 10 from the moving water should excessive wind or waves threaten the assembly. Such a mechanical position device 70 can also be attached to a moving water energy conversion device 10, positioned in a stream or below a dam to remove the energy conversion device 10 in case of an emergency. In addition, the vessels 80 supporting the drive shaft member 20 include inflatable ballast tanks 82 that are sensitive to fluid pressure and air pressure. The drive shaft member 20 is coupled to a device for converting the rotational energy of the drive shaft member 20 to an alternative type of energy.

Figure 10:
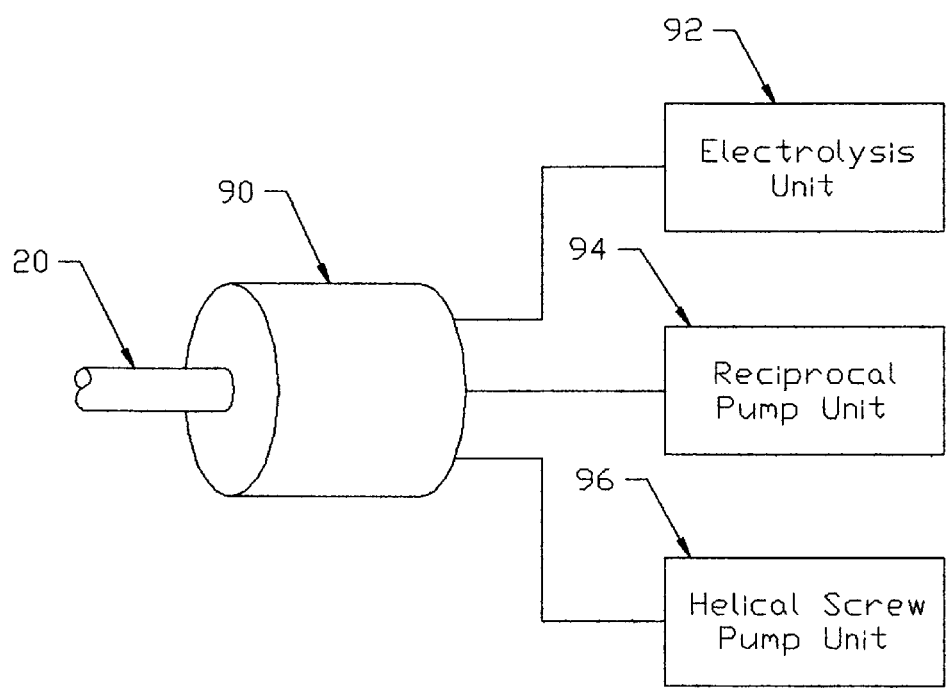
FIG. 10 is a block diagram of the moving water energy conversion device of the present invention powering a variety of useful machines.

As depicted in FIG. 10, an electrical generator unit 90 is operatively connected to the drive shaft member 20 for producing electrical power, which can be used to power numerous useful machines. For example, the electrical power generated can operate an electrolysis cell unit 92 to produce hydrogen and oxygen. Also, the electrical power generated can operate a reciprocal pump 94 or a helical screw pump 96, both of which can transfer water for a variety of useful purposes, including irrigation, or providing pressure for a reverse osmosis system to purify water. Alternatively, the reciprocal pump 94 or a helical screw pump 96 can be coupled mechanically to the drive shaft member 20 for direct power transfer.

While the invention has been particularly shown and described with reference to preferred embodiments thereof, it will be understood by those skilled in the art that various changes in form and details may be made therein without departing from the spirit and scope of the invention.

I claim:

1. A moving water energy conversion device adapted for secure positioning in flowing water comprising;
    a supported drive shaft member with an odd number of at least three radial extension strut assemblies each secured at a proximal end thereto, the radial strut assemblies positioned equidistance apart on the drive shaft member, each strut assembly having at least two strut members, each strut member attached at a distal end through a hinge member to a radially oriented, planar, paddle blade member separated from the drive shaft member, each planar, paddle blade member rotatable against the radial strut assembly in an active energy conversion segment of a rotary cycle, each planar, paddle blade member, by fluid pressure of moving water, reverting to a vertical stance as the planar, paddle blade member is elevated out of moving water by the individual radial extension strut assembly attached thereto.

2. The moving water energy conversion device of claim 1, wherein the odd number of radial extension strut assemblies each secured at a proximal end to the supported drive shaft member is selected from the group consisting of three, five, seven and nine strut assemblies.

3. The moving water energy conversion device of claim 1, wherein the radial extension strut members of the strut assemblies include at least first and second telescoping sections constructed for telescopic extension and return of the strut members.

4. The moving water energy conversion device of claim 1, wherein the planar, hinged paddle blade members each include opposed, non-planar end sections, thereby confining moving water contacting the planar, paddle blade member there between in the active energy conversion segment of the rotary cycle.

5. The moving water energy conversion device of claim 1, wherein the planar, hinged paddle blade members each include a plurality of overlapping horizontal blade segments, each segment attached at a first edge through a hinge member to each associated strut member, with a second opposed edge of each blade segment overlapping the first edge of an adjacent blade segment in the active energy conversion segment of the rotary cycle, each blade segment reverting to a vertical stance as the blade segments is elevated out of moving water by the individual radial extension strut assembly attached thereto.

6. The moving water energy conversion device of claim 1, further including a mechanical positioning device secured to the energy conversion device for selective vertical and horizontal movement thereof.

7. The moving water energy conversion device of claim 1, further including an adjustable, fluid flow facing, debris screen device for protecting water contacting portions of the energy conversion device.

8. The moving water energy conversion device of claim 1, further including a vessel supporting the drive shaft member, the vessel having inflatable ballast tanks sensitive to fluid pressure and air pressure.

9. The moving water energy conversion device of claim 1, further including an electrical generator operatively connected to the drive shaft member for generating electrical power.

10. The moving water energy conversion device of claim 9, further including an electrical hydrolysis system powered by the electrical generator.

11. The moving water energy conversion device of claim 1, further including a reciprocal fluid pump mechanically attached to the drive shaft member.

12. The moving water energy conversion device of claim 1, further including a helical screw type of fluid elevator mechanically attached to the drive shaft member.

13. A moving water energy conversion device adapted for secure positioning in flowing water comprising;
  a supported drive shaft member with an odd number of at least three radial extension strut assemblies each secured at a proximal end thereto, the radial strut assemblies positioned equidistance apart on the drive shaft member, each strut assembly having at least two strut members, each strut member attached at a distal end through a hinge member to a radially oriented, planar, paddle blade member separated from the drive shaft member, each paddle blade members including opposed, non-planar end sections, thereby confining moving water contacting the paddle blade member there between in the active energy conversion segment of the rotary cycle, each planar, paddle blade member rotatable against the radial strut assembly in an active energy conversion segment of a rotary cycle, each planar, paddle blade member, by fluid pressure of moving water, reverting to a vertical stance as the planar, paddle blade member is elevated out of moving water by the individual radial extension strut assembly attached thereto; and
  an adjustable, fluid flow facing, debris screen device for protecting water contacting portions of the energy conversion device.

14. The moving water energy conversion device of claim 13, wherein the odd number of radial extension strut assemblies each secured at a proximal end to the supported drive shaft member is selected from the group consisting of three, five, seven and nine strut assemblies.

15. The moving water energy conversion device of claim 13, wherein the radial extension strut members of the strut assemblies include at least first and second telescoping sections constructed for telescopic extension and return of the strut members.

16. The moving water energy conversion device of claim 13, wherein the planar, hinged paddle blade members each include a plurality of overlapping horizontal blade segments, each segment attached at a first edge through a hinge member to each associated strut member, with a second opposed edge of each blade segment overlapping the first edge of an adjacent blade segment in the active energy conversion segment of the rotary cycle, each blade segment reverting to a vertical stance as the blade segments is elevated out of moving water by the individual radial extension strut assembly attached thereto.

17. The moving water energy conversion device of claim 13, further including a mechanical positioning device secured to the energy conversion device for selective vertical and horizontal movement thereof.

18. The moving water energy conversion device of claim 13, further including a vessel supporting the drive shaft member, the vessel having inflatable ballast tanks sensitive to fluid pressure and air pressure.

19. The moving water energy conversion device of claim 13, further including an electrical generator operatively connected to the drive shaft member for generating electrical power.

20. A moving water energy conversion device adapted for secure positioning in flowing water comprising;
  a supported drive shaft member with an odd number of at least three radial extension strut assemblies each secured at a proximal end thereto, the radial strut assemblies positioned equidistance apart on the drive shaft member, each strut assembly having at least two telescoping strut members each strut member including at least first and second telescoping sections constructed for telescopic extension and return, each strut member attached at a distal end through a hinge member to a radially oriented, planar, paddle blade member separated from the drive shaft member, each paddle blade members including opposed, non-planar end sections, thereby confining moving water contacting the paddle blade member there between in the active energy conversion segment of the rotary cycle, each planar, paddle blade member rotatable against the radial strut assembly in an active energy conversion segment of a rotary cycle, each planar, paddle blade member, by fluid pressure of moving water, reverting to a vertical stance as the planar, paddle blade member is elevated out of moving water by the individual radial extension strut assembly attached thereto; and
  an adjustable, fluid flow facing, debris screen device for protecting water contacting portions of the energy conversion device.

21. The moving water energy conversion device of claim 20, wherein the odd number of radial extension strut assemblies each secured at a proximal end to the supported drive shaft member is selected from the group consisting of three, five, seven and nine strut assemblies.

22. The moving water energy conversion device of claim 20, further including a mechanical positioning device secured to the energy conversion device for selective vertical and horizontal movement thereof.

23. The moving water energy conversion device of claim 20, further including an electrical generator operatively connected to the drive shaft member for generating electrical power.

* * * * *